Patented Jan. 27, 1942

2,271,367

UNITED STATES PATENT OFFICE 2,271,367

REFRACTORY ZIRCONIA CASTING

Gordon S. Fulcher, Chevy Chase, Md., and Theodore E. Field, Louisville, Ky., assignors to Corhart Refractories Company, Louisville, Ky., a corporation of Delaware No Drawing. Application October 11, 1939, Serial No. 299,041

8 Claims. (Cl. 106—57)

It is the object of this invention to produce refractory articles which are superior in both spalling resistance and resistance to corrosion by molten glass and which are particularly adapted to use in glass melting furnaces especially for feeder parts.

The process of electrically fusing and casting refractory batches produces articles in general which are relatively non-porous and, for batches not too high in silica or other glass forming constituents, are largely crystalline. These two factors make such refractories superior to the less crystalline, more porous fired refractories made by ceramic methods in point of resistance to chemical attack by fluxes such as glass. On the other hand, these dense refractories do not withstand heat shock as well as the more open structured ceramically bonded refractories. This is particularly true of small castings which in common practice are made by pouring the molten metal into cold molds. The relatively quick freezing of small articles compared to large, naturally results in the presence of greater strain in the finished article which then tends to relieve such strain by cracking upon reheating in use.

It is now known that castings of beta-alumina have a superior resistance to spalling action compared to corundum or mullite refractories. We have found however that for common large volume commercial glasses such as bottle glass the resistance of a beta-alumina casting to corrosion is somewhat less than that of the cheaper corundum castings which would seriously limit its saleability for use in such glasses.

We have now discovered that zirconia castings are more resistant to corrosion than either beta-alumina or corundum castings and that beta-alumina can also be produced in zirconia castings, to which it imparts some of its characteristic resistance to spalling. We have found that the corrosion resistances of such castings are intermediate between those of beta-alumina and zirconia alone according to the amount of each present so long as a substantial amount of each phase is formed. Because of the much greater corrosion resistance of the crystalline zirconia phase, it is thus possible to introduce sufficient beta-alumina to obtain acceptable spalling resistance and still have greater resistance to chemical corrosion than the commercial corundum and mullite refractories now on the market.

Beta-alumina is formed by adding soda or potassia to alumina and it is well known in the art that addition of any silica requires an increase of soda or potassia in the batch to preserve the beta-alumina phase. Since the extra alkali and silica form a less resistant glass phase, the corrosion resistance is obviously decreased by this addition and it is impracticable to go beyond a few percent silica. We have found that for the first 5 to 15% zirconia introduced, the resistance to corrosion actually decreases as silica increases. Unlike silica however a saturated glass is soon formed and crystalline zirconia separates at higher percentages and the superior resistance of this phase offsets the poorer resistance of the glass phase. We have discovered that in zirconia-beta-alumina castings the zirconia can be as low as 20% and still possess a resistance to corrosion superior to aluminous cast refractories now on the market.

Pure zirconia itself is relatively expensive but a grade containing 5 or 6% $SiO_2$ is produced commercially at a much cheaper cost. This material is obtained in the first stage of preparing pure zirconia from purified zircon. The zircon is a natural product and relatively cheap. The bulk of the silica is reduced from this by melting in an electric furnace with the addition of coke to produce the zirconia product with 5 or 6% $SiO_2$. If this product is used for our zirconia-beta-alumina castings, from one to five per cent silica is introduced which requires an increase in alkali. The difference in cost is such however that it is advantageous to use a little more of this zirconia-silica product to obtain the same resistance than to use a little less of the more expensive pure zirconia. For certain special glasses the presence of silica may be objectionable and the use of pure materials preferred but this is not necessary with bottle glasses.

We have found that when less soda or potassia is used than required to form beta-alumina, we also obtain corundum as a crystal phase. Since corundum is also slightly more resistant to corrosion than beta-alumina and is cheaper than pure zirconia, it is also advantageous from the standpoint of cost to replace part of the zirconia phase with corundum when the utmost resistance is not required.

Corundum can also be advantageously substituted from the standpoint of present costs for part of the zirconia phase in castings made with the 95% $ZrO_2$-5% $SiO_2$ raw material.

Any materials which will give the desired chemical compositions and therefore produce the desired physical compositions on casting and annealing can be used for batch. From the standpoint of present costs however we prefer to use $Na_2CO_3$ and $K_2CO_3$ for alkali addition and Bayer process alumina which contains some soda for the alumina addition. We use pure zirconia as made by electric fusion, and the reduced zircon product analyzing around 95% $ZrO_2$, the remainder being $SiO_2$ and minor impurities of $Fe_2O_3$, $TiO_2$, etc., as source of zirconia. These or other materials can obviously be combined in various ways to give physical and chemical compositions disclosed above.

What we claim is:

1. A cast refractory article containing at the most a slight amount of silica and consisting principally of zirconia, alumina and at least one of the group consisting of $Na_2O$ and $K_2O$ in which the zirconia is greater than 20% and the ratio of alumina to alkali is less than 19 to 1 by weight by chemical analysis.

2. A cast refractory article consisting principally of crystalline zirconia and beta-alumina in which the total zirconia is not less than 20% by weight by chemical analysis.

3. A cast refractory article consisting principally of zirconia, alumina, silica and at least one of the group consisting of $Na_2O$ and $K_2O$ in which the zirconia is greater than 20%, the silica less than 6%, and the ratio of alumina to total alkali less than 19 to 1 by weight by chemical analysis.

4. A cast refractory article consisting principally of crystalline zirconia, beta-alumina, and a siliceous glass in which the total zirconia is not less than 20% by weight by chemical analysis.

5. A cast refractory article containing at the most a slight amount of silica and consisting principally of zirconia, alumina and at least one of the group consisting of $Na_2O$ and $K_2O$ in which the zirconia is greater than 20% and the total alkali is between 1 and 8% by weight by chemical analysis.

6. A cast refractory article consisting principally of crystalline zirconia, beta-alumina, and corundum in which the total zirconia is greater than 20% by weight by chemical analysis.

7. A cast refractory article consisting principally of zirconia, alumina, silica and at least one of the group consisting of $Na_2O$ and $K_2O$ in which the zirconia is greater than 20%, the silica less than 6%, and the total alkalies between 1 and 8% by weight by chemical analysis.

8. A cast refractory article consisting principally of crystalline zirconia, beta-alumina, corundum and a siliceous glass in which the total zirconia is greater than 20% by weight by chemical analysis.

GORDON S. FULCHER.
THEODORE E. FIELD.